United States Patent [19]

Kirbis et al.

[11] 4,204,318

[45] May 27, 1980

[54] APPARATUS FOR RETRACTING THE STATOR COIL OF AN ELECTRIC MOTOR

[75] Inventors: Manfred Kirbis, Harrislee; Peter Schilde, Flensburg; Gert Englmaier, Harrislee, all of Fed. Rep. of Germany

[73] Assignee: Danfoss A/S, Nordborg, Denmark

[21] Appl. No.: 923,821

[22] Filed: Jul. 12, 1978

[30] Foreign Application Priority Data

Jul. 19, 1977 [DE] Fed. Rep. of Germany ....... 2732477

[51] Int. Cl.[2] ...................... H02K 15/06; H02K 15/10
[52] U.S. Cl. ....................................... 29/734; 29/596; 29/736
[58] Field of Search .................. 29/596, 606, 734, 736, 29/732; 310/215

[56] References Cited

U.S. PATENT DOCUMENTS 4,097,989   7/1978   Stanczak, Jr. .......................... 29/734

*Primary Examiner*—Carl E. Hall
*Attorney, Agent, or Firm*—Wayne B. Easton

[57] ABSTRACT

The invention relates to apparatus for installing stator coils in an electric motor of the type in which the coil grooves are each lined with groove insulation which projects beyond the end of a stator in the form of turned over collars. In the prior art these collars tend to interfere with or obstruct the installation of coil strands and cover strips for the coil grooves. Rod elements used for installing the coil groove cover strips are formed to extend between and splay apart adjacent insulation collar portions to minimize this interference tendency.

2 Claims, 7 Drawing Figures

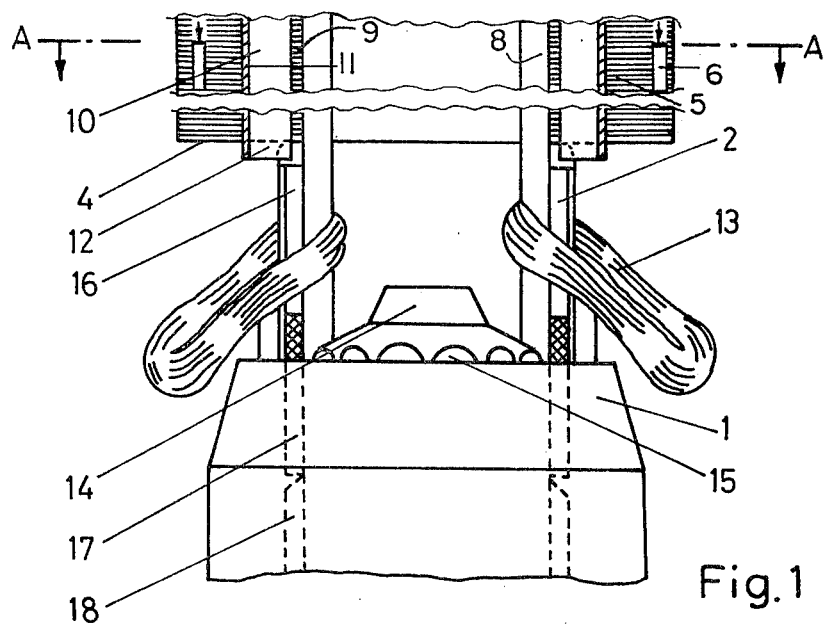
Fig. 1
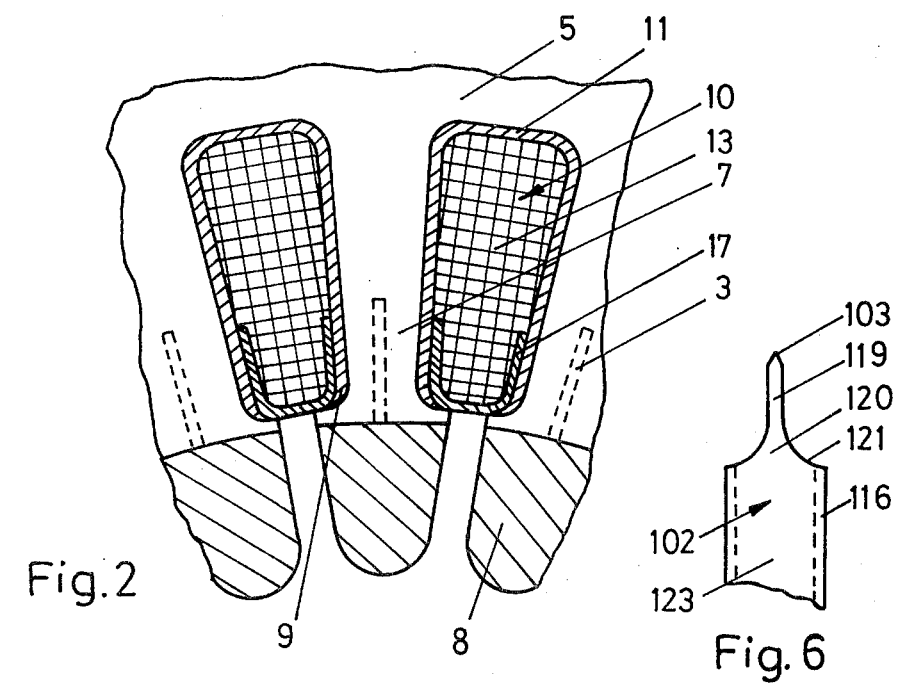
Fig. 2
Fig. 6

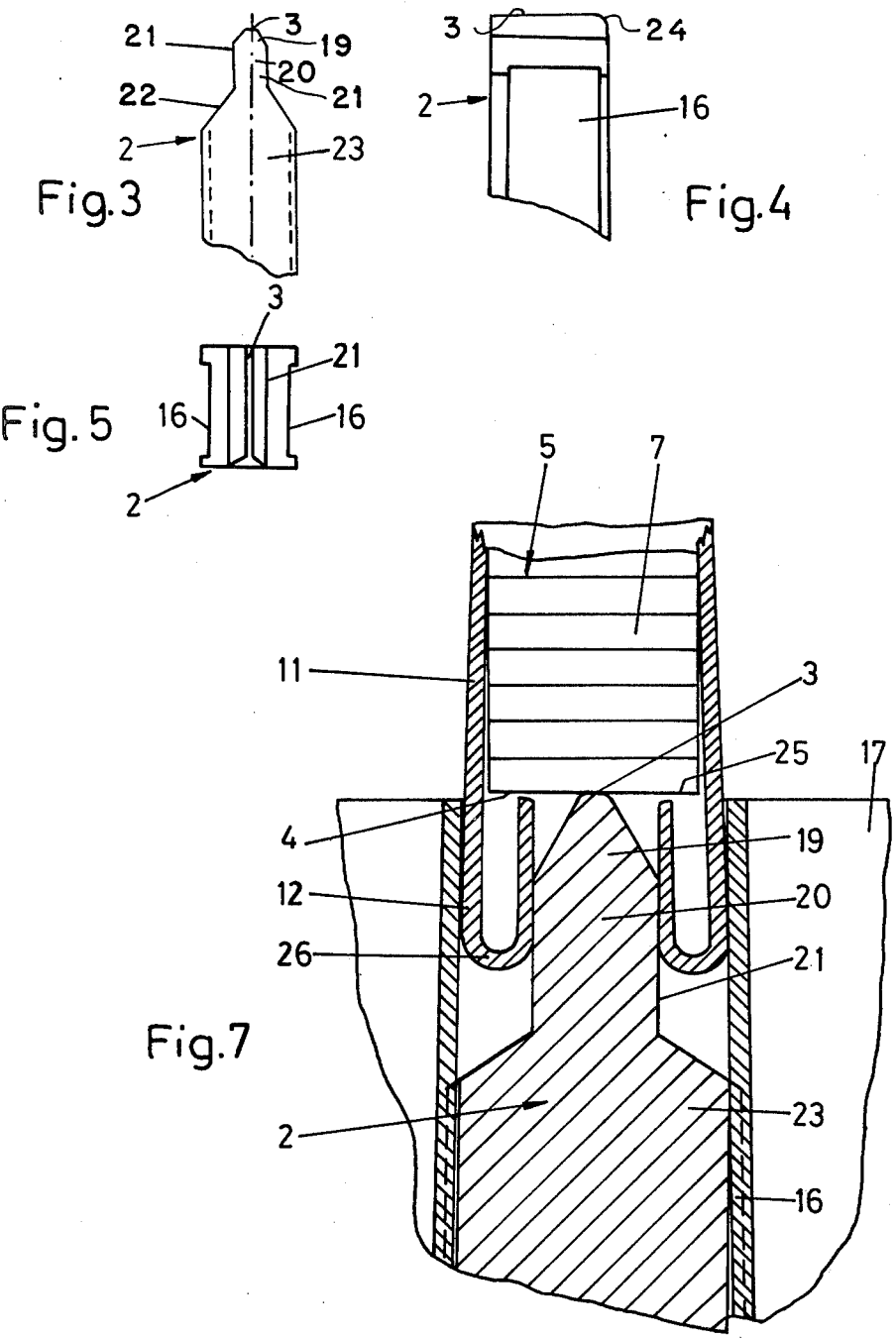

APPARATUS FOR RETRACTING THE STATOR COIL OF AN ELECTRIC MOTOR

The invention relates to an apparatus for retracting the stator coil of an electric motor of which the grooves are lined with groove insulation which projects beyond the end face of the stator and is preferably in the form of a turned-over collar comprising supporting laminations associated with each tooth beyond the stator bore, guide laminations disposed in the stator bore in front of the peaks of the teeth, a head passable through the stator bore for pushing the prefabricated coil strands into the grooves, and insertion laminations for pushing cover strips into the grooves that close the grooves and are passed between the supporting laminations.

In known apparatus of this kind, after prefabricated groups of coils have been placed over the supporting and guide laminations, the stator is pushed on the guide laminations and pressed towards the supporting laminations with the aid of a holding device. The supporting laminations have a narrow abutment face which extends in the tangential direction and comes to lie against the peak of the tooth. The width is larger than the width of the tooth by about twice the thickness of the groove insulation. Behind the abutment face there is a depression in which the turned-over collars of the groove insulation are accommodated so that they will form the least possible obstruction to the entry of the coil strands when the push head is passed through the stator bore and to the entry of the cover strips which are held in guides of the supporting laminations and are pushed in by means of the insertion laminations. During the operation of this apparatus, there is a recurring tendency for individual wires not coming to lie at the correct position in the groove but between the cover slides and groove insulation or, in extreme cases, even on the tooth or in the path of the rotor. This error depends on various factors such as the wire diameter, stiffness of the wire, filling factor, height of the stator packet etc. It could hitherto be counteracted only be extremely carefully aligning the individual laminations and the push head. Another frequently occurring fault is that tears which could considerably reduce the life of the motor occur at the collars of the groove insulation.

The invention is based on the problem of providing a retracting apparatus of the aforementioned kind in which primarily faults in the wire position are avoided.

This problem is solved according to the invention in that the end portions of the supporting laminations adjacent the stator end face are so much narrower in the peripheral direction than the tooth and have such a shape that they can be passed between adjacent collars and thereby splay apart the confronting collar sides.

In this construction, the two sides of a collar are to some extent resiliently pushed towards each other so that the gap between them becomes narrower. As a result, the collar resiliently lies against the cover slide as the latter is introduced. This avoids a gap between the collar and cover slide that was otherwise unavoidable by reason of tolerance in the dimensions and that is a cause for the protrusion of wires. Further, the wires are retracted in a more intensely bundled form so that the cover strip which often envelops the coil strand in U-formation can be introduced more easily and no wires are located between the cover slide and the groove insulation. It is particularly favourable if the collar or the groove insulation is turned over. This leads to a correspondingly good springyness and resilience of the collar. In addition, the rounding of the turned-over collar facilitates introduction of the wires and of the cover slide. Another advantage is that the collars are not bent over the sharp edge between the groove and stator end face which seemed to be the cause of tears in the collar. Instead, the groove insulation is practically not stressed at all at this position; it is even possible to lift it slightly from the sharp edge by means of the supporting laminations.

The part passed between the adjacent collars may have an abutment face for abutting the stator end face. This may be an additional abutment face or, to simplify manufacture, the only abutment face. It extends substantially radially rather than tengentially.

Further, the end portion of the supporting laminations may have a substantially constant cross-section in the radial direction. Three-dimensional shaping that would involve more expensive production can be substantially avoided.

The end portion desirably terminates as a blade or wedge. In this way the introduction of the end portion between adjacent collars is facilitated. Although this shape results in a reduced abutment face, the latter is quite sufficient because of the multitude of supporting laminations.

In one embodiment, the splaying surfaces of the end portion are curved. Such curved surfaces provide good adaptation to a turned-over collar. In a preferred different embodiment, the splaying surfaces of the end portion are parallel and project beyond the collar height. This construction enables roughly the same splaying effect to be obtained regardless of the height of the collar. Very large tolerances in the height of the collar are therefore permissible.

The invention will now be described in more detail with reference to examples illustrated in the drawing, wherein:

FIG. 1 is a diagrammatic representation of the apparatus according to the invention;

FIG. 2 is a part-section along the line A—A in FIG. 1;

FIG. 3 is a front elevation of a supporting lamination constructed according to the invention;

FIG. 4 is a side elevation of the FIG. 3 lamination;

FIG. 5 is a plan view of the FIG. 3 lamination;

FIG. 6 is a front elevation of a different form of supporting lamination, and

FIG. 7 is a part-section of the FIG. 3 supporting lamination with the stator placed thereon.

Fixed supporting laminations 2 project upwardly from a base 1 which has hydraulic drive means. The end face 4 of a stator 5 is pressed with the aid of diagrammatically illustrated depressor means 6 against the upper abutment faces 3 of the supporting laminations 2. The abutment faces 3 each extend radially beneath a tooth 7. Guide laminations 8 within the stator bore cover the peaks 9 of the teeth. The grooves 10 of the stator are lined with insulation 11 which projects at both sides in the form of a turned-over collar 12. Prefabricated groups 13 of the coil are placed about the supporting laminations 2 and guide laminations 8. A head 14 having recesses 15 for the guide laminations 8 is displaceable upwardly by a hydraulic drive, whereby the individual strands of the coil are pushed into the associated grooves. The number of recesses 15 shows that there is a number of supporting and guide laminations corresponding to the number of teeth. However, for the sake of clarity, only two are shown in FIG. 1. The supporting laminations 2 comprise lateral guides 16 into which cover strips 17 of U-shaped cross-section can be pushed upwardly by insertion laminations 18 and finally into the groove 10.

The shape of a preferred embodiment for the upper end portion of the supporting laminations 2 is shown in FIGS. 3 to 5. The abutment face 3 is formed by the tip of a wedge 19. An adjoining splaying portion 20 has two parallel side walls 21 which merge by way of further inclined faces 22 with the main portion 23 which has lateral longitudinal grooves 24 for guiding the cover strips 17. The cross-section of FIG. 3 is substantially constant over the radial width of the wedge 19 and of the splaying portion 20. There is a round 24 only at the radially outer end for facilitating transfer of the coil strands 13.

When the prepared stator 5 is placed on the supporting laminations 2 from above (FIG. 7), the wedge 19 and the splaying portion 20 penetrate between the turned-over collars 12 of adjacent groove insulations 11 until the stator end face 4 lies against the abutment face 3 of the supporting laminations 2. The splaying portion 20 has a width reduced in relation to the width of the tooth 7 so that the turned-over collars 12 cannot be quite accommodated and are splayed apart under a slight bias. The groove insulation can thereby lift off the sharp edge 25 between the groove and the stator end face. At this same time, the gap between the collars of one groove insulation 11 is somewhat constricted in the region of the supporting laminations 2 so that very intensive bundling takes place at the position where the wires are first pulled into the groove. Introduction of the wires is assisted by the round 26 of the turned-over collars 12. There can be no jamming because the aforementioned constricted portion can expand resiliently if necessary. When the cover strips 17 are pushed in after retraction of the coil, the groove insulations 11 in the collar region are intimately pressed against these cover strips 17. These cover strips therefore remain in intimate abutment with the groove insulations during further insertion. There is practically no danger that wires may become jammed in the gap between these parts or even project outwardly through this gap. The aforementioned bundling of the wires during insertion asists this object. The length of the parallel side faces 21 is selected so that differently high collars 12 may be accommodated. This has the advantage that during turning over of the collars there need be no particular accuracy and that axial displacements of the groove insulation 11 are also permissible of the kind occurring during retraction of the coil within the limits of the play given by the collars.

FIG. 6 shows a different embodiment of a supporting lamination 102 of which the main portion 123 provided with grooves 116 correspond to that of the previously described embodiment. However, the abutment face 103 is carried by a blade 119 whilst the splaying portion 120 is bounded by curved faces 121. These may correspond to the curvature of the collars.

What is claimed is:

1. Apparatus for installing stator coils in an electric motor of the type in which the coil grooves are each lined with groove insulation which projects beyond the end face of the stator in the form of a turned over collar, comprising a base member, a plurality of circumferentially arranged coil strand guide members extending upwardly from said base member for extending through a stator bore for radial abutting engagement with surface portions of said bore between said grooves, a head member in guiding engagement with said guide members for passing through a stator bore to push coil strands into stator coil grooves, a plurality of circumferentially arranged guide rods for pushing cover strips into stator coil grooves, said guide rods extending upwardly from said base member and being radially outward from and circumferentially aligned with said coil strand guide members, said guide rods having portions for axial abutting engagement with surface portions of said stator between said grooves, said guide rod end portions being generally tapered to splay apart adjacent turned over groove insulation collars which extend beyond the end face of the stator.

2. Apparatus according to claim 1 wherein said tapered end portions each has the taper thereof formed by curved surfaces on opposite sides thereof.

* * * * *